United States Patent
Woo et al.

(10) Patent No.: US 9,471,107 B2
(45) Date of Patent: Oct. 18, 2016

(54) METHOD AND ELECTRONIC DEVICE FOR INPUTTING HANDWRITING DATA USING ROLLED-UP FLEXIBLE DISPLAY

(71) Applicant: Samsung Electronics Co., Ltd, Gyeonggi-do (KR)

(72) Inventors: Seung-Soo Woo, Gyeonggi-do (KR); Yun-Ju Seo, Gyeonggi-do (KR); Jin-Gil Yang, Gyeonggi-do (KR); Sae-Mee Yim, Gyeonggi-do (KR); Sook-Kyung Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 14/167,860

(22) Filed: Jan. 29, 2014

(65) Prior Publication Data
US 2014/0210757 A1    Jul. 31, 2014

(30) Foreign Application Priority Data
Jan. 29, 2013    (KR) .......................... 10-2013-0009754

(51) Int. Cl.
*G06F 1/16*       (2006.01)
*G06F 3/0488*     (2013.01)
*G06F 3/0354*     (2013.01)

(52) U.S. Cl.
CPC ........... *G06F 1/1643* (2013.01); *G06F 1/1652* (2013.01); *G06F 3/03545* (2013.01); *G06F 3/04883* (2013.01)

(58) Field of Classification Search
CPC ............... G06F 1/1643; G06F 1/1652; G06F 3/03545; G06F 3/04883
See application file for complete search history.

(56) References Cited

U.S. PATENT DOCUMENTS

| | | | | |
|---|---|---|---|---|
| 6,130,666 A | * | 10/2000 | Persidsky | G06F 3/0354 178/19.01 |
| 2001/0025289 A1 | * | 9/2001 | Jenkins | G06F 1/3203 708/141 |
| 2002/0181744 A1 | * | 12/2002 | Vablais | G06K 9/22 382/107 |
| 2005/0024346 A1 | * | 2/2005 | Dupraz | G06F 3/03545 345/179 |
| 2007/0211036 A1 | * | 9/2007 | Perkins | G06F 1/1615 345/173 |
| 2009/0184935 A1 | * | 7/2009 | Kim | G06F 3/0488 345/173 |

FOREIGN PATENT DOCUMENTS

| | | | | |
|---|---|---|---|---|
| KR | 10-2005-0017734 | | 2/2005 | |
| KR | 10-2010-0129676 | | 12/2010 | |
| SE | WO 2013084087 A1 | * | 6/2013 | ........... G06F 1/1643 |

OTHER PUBLICATIONS

Seth, Radhika. "One Pen, One Phone". Yanko Design. http://www.yankodesign.com/2012/08/10/onepenonephone/. Aug. 10, 2012.*
"OLED Roll-Up Pen". PC Magazine. Jul. 2003.*

* cited by examiner

*Primary Examiner* — Larry Sternbane (57) ABSTRACT

A method for controlling an electronic device. The method includes: detecting whether a flexible display is rolled up into a pen-like shape; detecting a handwriting motion according to movement of the flexible display by using at least one sensor when the flexible display is rolled up into a pen-like shape; and displaying a locus according to the handwriting motion of the flexible display on the flexible display.

20 Claims, 9 Drawing Sheets

METHOD AND ELECTRONIC DEVICE FOR INPUTTING HANDWRITING DATA USING ROLLED-UP FLEXIBLE DISPLAY

PRIORITY

The present application is related to and claims priority under 35 U.S.C. §119 to an application filed in the Korean Intellectual Property Office on Jan. 29, 2013 and assigned Serial No. 10-2013-0009754, the contents of which are incorporated herein by reference.

TECHNICAL FIELD

The present disclosure relates to an electronic device, and in particular, to a method and apparatus for inputting a character in an electronic device.

BACKGROUND

Recently, with the rapid development of electronic devices, such as smart phones and tablet personal computers, electronic devices capable of performing wireless voice communication and information exchange have become necessities. In addition, as the size of an electronic device decreases and the size of a display increases, there is an increasing need for a new display device. Therefore, a flexible display has been developed which is made of material having flexibility characteristics and is capable of being bent like a paper and maintaining a display function even after being bent.

The flexible display may change the shape and size of a display device according to user control. For example, a user may deform the shape of the flexible display, such as folds the flexible display in half or rolls up the flexible display. As described above, the flexible display has an advantage in that the shape and size of the display device may be changed according to a user's intention.

However, a character input method using the flexible display is not largely different from a conventional electronic device. For example, when the user wants to input a character to the flexible display, the user directly handwrites the character on the flexible display using an electronic pen in order to input the character. As another example, when the user wants to input a character to the flexible display, the user inputs the character by using a virtual keyboard displayed on the flexible display. As described above, the character input method is not optimal for the flexible display.

Accordingly, there is a need for a character input method specialized to the flexible display.

SUMMARY

To address the above-discussed deficiencies of the prior art, it is a primary object of the present disclosure is to provide a method and apparatus for inputting a character in an electronic device including a flexible display.

Another object of the present disclosure is to provide a method and apparatus for detecting change in the shape of a flexible display in an electronic device including the flexible display.

Another object of the present disclosure is to provide a method and apparatus for detecting a grip when a flexible display is rolled up into a pen-like shape in an electronic device including the flexible display.

Another object of the present disclosure is to provide a method and apparatus for detecting the motion of a flexible display when the flexible display is rolled up into a pen-like shape in an electronic device including the flexible display.

Another object of the present disclosure is to provide a method and apparatus for displaying a locus according to the motion of a flexible display when the flexible display is rolled up into a pen-like shape in an electronic device including the flexible display.

Another object of the present disclosure is to provide a method and apparatus for determining the lower portion of a flexible display when the flexible display is rolled up into a pen-like shape in an electronic device including the flexible display.

Another object of the present disclosure is to provide a method and apparatus for enabling a laser pointer to output laser according to the motion of the lower portion of a flexible display when the flexible display is rolled up into a pen-like shape in an electronic device including the flexible display.

According to an aspect of the present disclosure, a method for controlling an electronic device includes: detecting whether a flexible display is rolled up into a pen-like shape; detecting a handwriting motion according to movement of the flexible display by using at least one sensor when the flexible display is rolled up into a pen-like shape; and displaying a locus according to the handwriting motion of the flexible display on the flexible display.

According to another aspect of the present disclosure, an electronic device includes: at least one processor; a flexible display; a grip sensor; a motion sensor; a memory; and at least one program stored in the memory and configured to be executable by the at least one processor, wherein the program includes an instruction for: detecting whether a flexible display is rolled up into a pen-like shape; detecting a handwriting motion according to movement of the flexible display by using at least one sensor when the flexible display is rolled up into a pen-like shape; and displaying a locus according to the handwriting motion of the flexible display on the flexible display.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

In the following description, examples of an electronic device include a mobile communication terminal including a flexible display (or flexible display device) of the electronic device, a smart phone, a tablet personal computer, an MP3 player, and a navigation device. Herein, the flexible display refers to a display device which may be physically bent or folded.

Figure 1A:
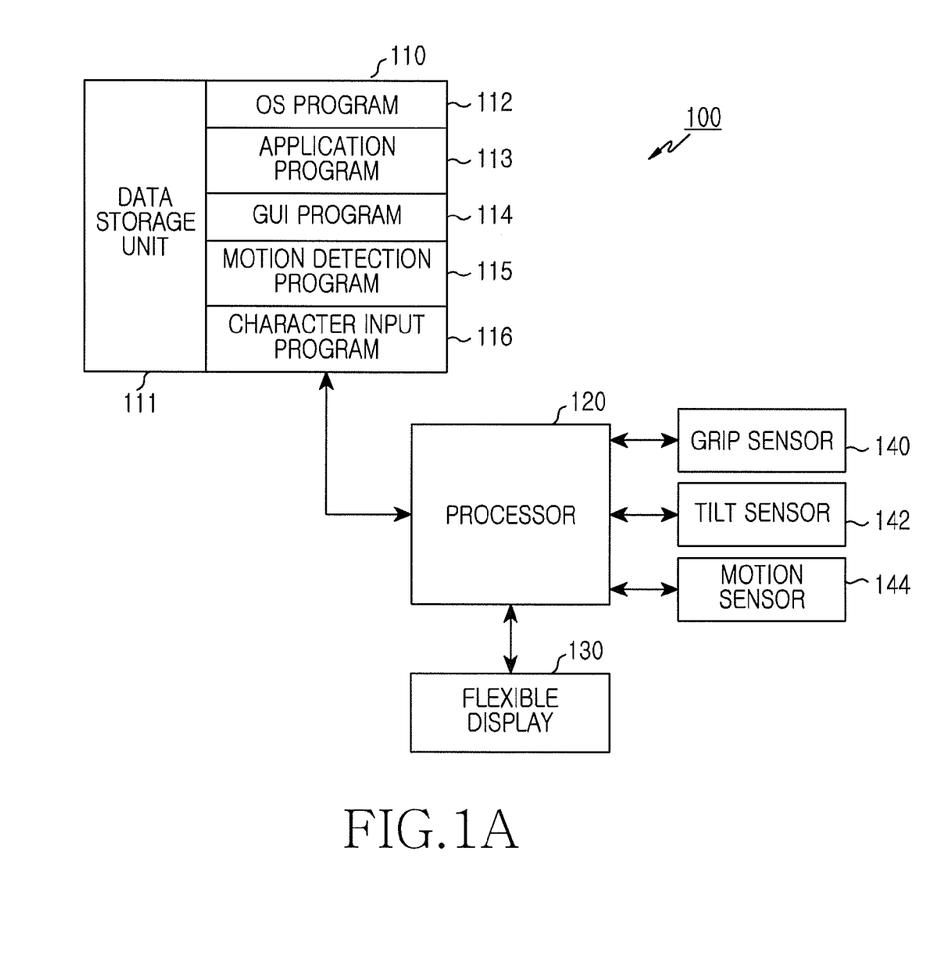
FIG. 1A illustrates a block configuration of an electronic device for inputting a character through a flexible display according to an embodiment of the present disclosure.

FIG. 1A illustrates a block configuration of an electronic device for inputting a character through a flexible display according to an embodiment of the present disclosure.

Referring to FIG. 1A, the electronic device 100 includes a memory 110, a processor 120, a flexible display 130, a grip sensor, a tilt sensor 142 and a motion sensor 144. The memory 110 may be configured in a plurality of ways and the processor 120 may be configured in a plurality of ways.

For example, the memory 110 includes a data storage unit 111, an operating system (OS) program 112, an application program 113, a graphic user interface (GUI) program 114, a motion detection program 115, a character input program 116, and the like. Also, since the program that is a software component may be represented as a set of instructions, the program may be referred to as an instruction set. The program may also be referred to as a module.

The memory 110 may store one or more programs including instructions for performing embodiments of the present disclosure.

The data storage unit 111 stores data generated during the performance of a function corresponding to the program stored in the memory 110. The data storage unit 111 according to the present disclosure may store font information. In this case, the font information includes font color, font size and font style.

In addition, the data storage unit 111 may store simple information to be displayed on a displayable area of the flexible display 130 in response to detecting that the flexible display 130 is rolled up. For example, the data storage unit 111 may store time information to be displayed on a displayable area of the flexible display 130 in response to detecting that the flexible display 130 is rolled up. In this case, the simple information includes time information and other graphic effect information such as user interface (UI)/user experience (UX) information.

The OS program 112 (for example, WINDOWS, LINUX, Darwin, RTXC, UNIX, OS X, or an embedded OS such as VxWorks) includes various software components for controlling general system operations. For example, general system operation controls may include memory control/management, storage hardware (device) control/management, and power control/management. The OS program 112 also performs a function for enabling smooth communication between various hardware components (devices) and software components (programs).

The application program 113 includes a browser application, an e-mail application, a message application, a word processing application, an address book application, a widget application, a digital right management (DRM) application, a voice recognition application, a voice replication application, a position determining function application, a location-based service (LBS) application, a telephone application, a schedule and task management application, and the like.

The GUI program 114 includes at lease one software component for providing a graphic user interface between a user and the electronic device 100. That is, the GUI program 114 includes at lease one software component for displaying user interface information on the entire area of the flexible display 130. According to the present disclosure, the GUI program 114 includes instructions for displaying simple information on a displayable area of the flexible display 130 in response to detecting that the flexible display 130 is rolled up. For example, the GUI program 114 may display time information on the displayable area of the flexible display 130 in response to detecting that the flexible display 130 is rolled up. As another example, the GUI program 114 may display a particular graphic effect on the displayable area of the flexible display 130 in response to detecting that the flexible display 130 is rolled up. In this case, the simple information to be displayed may be previously set in a design phase, or be modified by user control.

For example, the GUI program 114 may display a locus according to the motion (or movement) of a lower portion of the flexible display 130 on the displayable area of the flexible display 130 in response to detecting that the flexible display 130 is rolled up. Specifically, when the handwriting motion of the flexible display 130 that is rolled up into a pen-like shape is made by user control, the GUI program 114 may display the locus according to the handwriting motion on the displayable area of the flexible display 130.

In addition, the GUI program 114 may display the locus, to which a font is applied, on an arbitrary area of the flexible display 130 that is rolled up into a pen-like shape. In this case, the font includes color, size and style information.

The motion detection program 115 detects change in the shape of the flexible display 130. For example, the motion detection program 115 may detect that the flexible display 130 is rolled up into a pen-like shape. As another example, the motion detection program 115 may detect that the flexible display 130 rolled up into a pen-like shape is unrolled.

In addition, the motion detection program 115 detects a grip with respect to the flexible display 130. Specifically, the motion detection program 115 may detect whether the flexible display 130 rolled up into a pen-like shape is gripped (or held) by the user's hand through the grip sensor 140. In response to detecting that the flexible display 130 is gripped through the grip sensor 140, the motion detection program 115 may analyze a location at which the flexible display 130 is gripped and determine a displayable area. For example, when the user holds the flexible display 130 like the user holds a pen, the motion detection program 115 may determine an area that is not covered by the user's hand as the displayable area among the surface area of the flexible display 130 which is in the rolled-up state. That is, the motion detection program 115 may determine an area excluding an area that is touched by the user's hand, that is, an area that is not touched by the user's hand among the surface area of the pen-shaped flexible display 130 as the displayable area.

In addition, the motion detection program 115 may determine a lower portion of the flexible display 130 rolled up into a pen-like shape. In other words, the motion detection program 115 may determine a lower portion of the flexible display 130 rolled up into a pen-like shape by using at least one sensor. In this case, at least one sensor includes a tilt sensor 142 or a gravity sensor (not illustrated). For example, the motion detection program 115 may detect the tilt of the flexible display 130 rolled up into a pen-like shape and analyze the detected tilt to determine the lower portion of the flexible display 130 by using the tilt sensor 142. As another example, the motion detection program 115 may determine the lower portion of the flexible display 130 rolled up into a pen-like shape by using the gravity sensor (not illustrated).

In addition, the motion detection program 115 may detect the motion (or movement) of the flexible display 130 rolled up into a pen-like shape. In other words, the motion detection program 115 may detect the motion of the flexible display 130 rolled up into a pen-like shape by using the motion sensor 144. In this case, the motion sensor 144 may be provided in at least one of the lower portion and upper portion of the flexible display 130. When the motion sensor is provided in the lower portion of the flexible display 130, it is possible to detect the locus of the lower portion of the flexible display 130 through the motion sensor provided in the lower portion. For example, when the user perform a handwriting motion through the flexible display 130 rolled up into a pen-like shape, the motion detection program 115 may detect the handwriting locus of the flexible display 130 through the motion sensor 144.

The character input program 116 inputs a character to the flexible display 130 according to user control. Specifically, when the handwriting locus of the lower portion of the flexible display 130 is detected by the motion detection program 115, the character input program 116 may display a graphic effect corresponding to the detected handwriting locus on a displayable area of the flexible display 130 in real time. In this case, the character input program 116 may display the graphic effect according to predetermined font information.

In addition, the character input program 116 may analyze the handwriting locus of the lower portion of the flexible display 130 which is detected by the motion detection program 115, and display a character corresponding to the analyzed handwriting locus on the displayable area of the flexible display 130. For example, when, as a result of the analysis of the handwriting locus of the lower portion of the flexible display 130, the handwriting locus represents character "0", the character input program 116 may display character "0" on the displayable area. As another example, when, as a result of the analysis of the handwriting locus of the lower portion of the flexible display 130, the handwriting locus represents character "1", the character input program 116 may display character "1" on the displayable area. In this case, the character input program 116 may display the character according to predetermined font information.

Although not illustrated, the processor 120 may include at least one processor and a peripheral interface. In addition, the processor 120 executes a specific program (instruction set) stored in the memory 110 and performs a plurality of specific functions corresponding to the program.

Since the flexible display 130 is made of material having flexibility characteristics, such as plastic material, the flexible display 130 is a display device capable of maintaining a display function even when being bent like a paper. The flexible display 130 displays state information (indicators) generated during operation of the electronic device 100, limited numbers and characters, moving pictures, still pictures, or the like. In addition, the flexible display 130 may display a picture that is compensated to be seen as a flat picture even when being bent. In particular, the flexible display 130 according to the present disclosure includes a display device which may be arched, folded, bent, or rolled up. The shape of the flexible display 130 according to the present disclosure may be changed according to user control. For example, the flexible display 130 may be rolled up into a pen-like shape according to user control.

In addition, when the flexible display 130 is rolled up into a pen-like shape, the flexible display 130 may include a laser pointer which outputs a laser.

The grip sensor 140 detects change in pressure or capacitance corresponding to a grip state by the user. The grip sensor may include a resistive touch sensor, a C-type capacitive touch sensor, and a strain gauge sensor. In this case, the resistive touch sensor may be defined as a sensor for recognizing coordinates corresponding to change in resistance generated by the user's input to detect change in pressure. Furthermore, the C-type capacitive touch sensor may be defined as a sensor for recognizing coordinates through change in capacitance generated by the user's input. In addition, the strain gauge sensor recognizes the inner value of the sensor that is changed by pressure generated by the user to detect change in pressure. According to an alternative implementation, the grip state can be detected by using a proximity sensor rather than the grip sensor. For example, when the user holds the electronic device, the proximity sensor detects whether an object (that is, the user's hand) is proximate to the proximity sensor and outputs a relevant signal.

The tilt sensor 142 may detect the tilt of the flexible display 130 and calculate an angle θ formed between of the flexible display 130 and a floor surface. In this case, the tilt sensor 142 may be a gyro sensor capable of detecting the tilt of the flexible display 130.

The motion sensor 144 may be provided in at least one edge of the flexible display 130 and detect the motion (movement) of the flexible display 130. In particular, the motion sensor 144 according to the present disclosure may detect the motion and movement locus of the lower portion of the rolled-up flexible display 130.

Figure 1B:
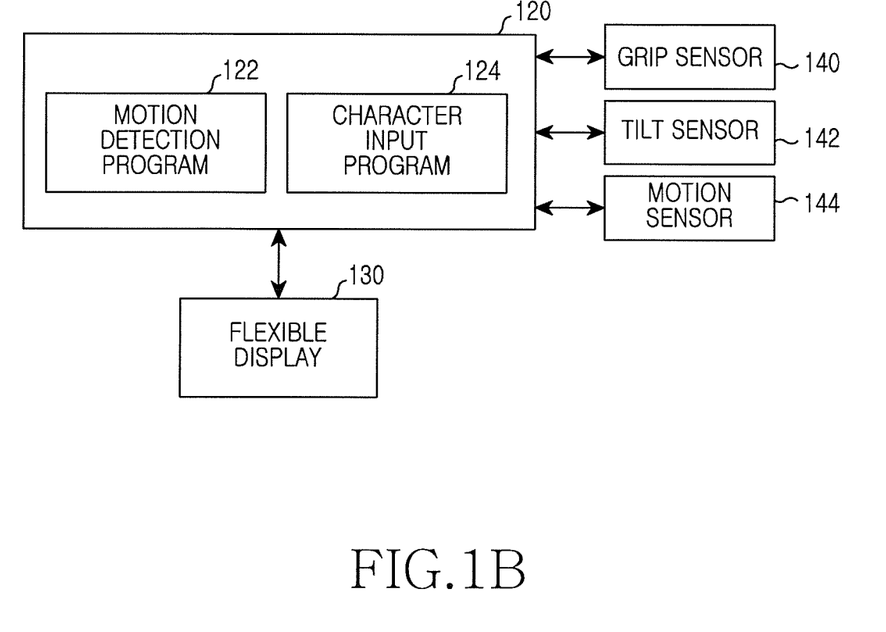
FIG. 1B illustrates a block configuration of a processor for inputting a character through a flexible display according to an embodiment of the present disclosure.

FIG. 1B illustrates a block configuration of a processor for inputting a character through a flexible display according to an embodiment of the present disclosure.

Referring to FIG. 1B, the processor includes a motion detection processor 122 and a character input processor 124.

The motion detection processor 122 detects change in the shape of the flexible display 130. For example, the motion detection processor 122 may detect that the flexible display 130 is rolled up into a pen-like shape. As another example, the motion detection processor 122 may detect that the flexible display 130 rolled up into a pen-like shape is unrolled.

In addition, the motion detection processor 122 detects a grip with respect to the flexible display 130. Specifically, the motion detection processor 122 may detect whether the flexible display 130 rolled up into a pen-like shape is gripped (or held) by the user's hand through the grip sensor 140. In response to detecting that the flexible display 130 is gripped through the grip sensor 140, the motion detection processor 122 may analyze a location at which the flexible display 130 is gripped and determine a displayable area. For example, when the user holds the flexible display 130 like the user holds a pen, the motion detection processor 122 may an area that is not covered by the user's hand as the displayable area among the surface area of the flexible display 130 which is in the rolled-up state. That is, the motion detection processor 122 may determine an area excluding an area that is touched by the user's hand, that is, an area that is not touched by the user's hand among the surface area of the flexible display 130 rolled into the pen-like shape as the displayable area.

In addition, the motion detection processor 122 may determine a lower portion of the flexible display 130 rolled up into a pen-like shape. In other words, the motion detection processor 122 may determine the lower portion of the flexible display 130 rolled up into a pen-like shape using at least one sensor. In this case, at least one sensor includes the tilt sensor 142 or a gravity sensor (not illustrated). For example, the motion detection processor 122 may detect the tilt of the flexible display 130 rolled up into a pen-like shape and analyze the detected tilt to determine the lower portion of the flexible display 130 by using the tilt sensor 142. As another example, the motion detection processor 122 may determine the lower portion of the flexible display 130 rolled up into a pen-like shape by using the gravity sensor (not illustrated).

In addition, the motion detection processor 122 may detect the motion (or movement) of the flexible display 130 rolled up into a pen-like shape. In other words, the motion detection processor 122 may detect the motion of the flexible display 130 rolled up into a pen-like shape by using the motion sensor 144. In this case, the motion sensor 144 may be provided in at least one of the lower portion and upper portion of the flexible display 130. When the motion sensor is provided in the lower portion of the flexible display 130, it is possible to detect the locus of the lower portion of the flexible display 130 through the motion sensor provided in the lower portion. For example, when the user perform a handwriting motion through the flexible display 130 rolled up into a pen-like shape, the motion detection processor 122 may detect the handwriting locus of the flexible display 130 through the motion sensor 144.

The character input processor 124 inputs a character to the flexible display 130 according to user control. Specifically, when the handwriting locus of the lower portion of the flexible display 130 is detected by the motion detection processor 122, the character input processor 124 may display a graphic effect corresponding to the detected handwriting locus on a displayable area of the flexible display 130 in real time. In this case, the character input processor 124 may display a graphic effect according to predetermined font information.

In addition, the character input processor 124 may analyze the handwriting locus of the lower portion of the flexible display 130 which is detected by the motion detection processor 122, and display a character corresponding to the analyzed handwriting locus on the displayable area of the flexible display 130. For example, when, as a result of the analysis of the handwriting locus of the lower portion of the flexible display 130, the handwriting locus represents character "0", the character input processor 124 may display character "0" on the displayable area. As another example, when, as a result of the analysis of the handwriting locus of the lower portion of the flexible display 130, the handwriting locus represents character "1", the character input processor 124 may display character "1" on the displayable area. In this case, the character input processor 124 may display a character according to predetermined font information.

Figure 2:
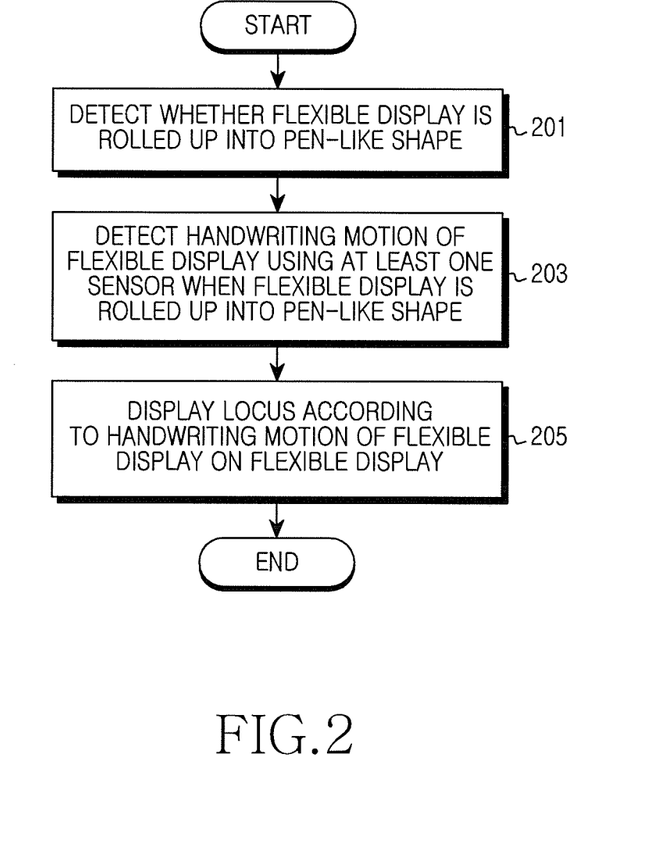
FIG. 2 illustrates a process of inputting a character through a flexible display in an electronic device according to an embodiment of the present disclosure.

FIG. 2 illustrates a process of inputting a character through a flexible display in the electronic device 100 according to an embodiment of the present disclosure.

Referring to FIG. 2, in step 201, the electronic device 100 detects whether the flexible display 130 is rolled up into a pen-like shape. When the flexible display 130 is rolled up into a pen-like shape, the electronic device 100 detects the handwriting motion of the flexible display 130 by using at least one sensor in step 203. Specifically, the electronic device 100 detects whether the flexible display 130 is rolled up into a pen-like shape and when the flexible display 130 is rolled up into a pen-like shape, detects a grip with respect to the flexible display 130 by using a grip sensor. Thereafter, the electronic device 100 determines the lower portion of the flexible display 130 by using a tilt sensor and/or a gyro sensor, and detects a handwriting motion according to the movement of the lower portion of the flexible display 130 by using a motion sensor.

In step 205, the electronic device 100 displays a locus according to the handwriting motion of the flexible display on the flexible display 130. In this case, the electronic device 100 may analyze the locus according to the handwriting motion of the flexible display 130, and display a character corresponding to the analyzed locus or display the locus according to the handwriting motion of the flexible display 130 in real time.

Figure 3:
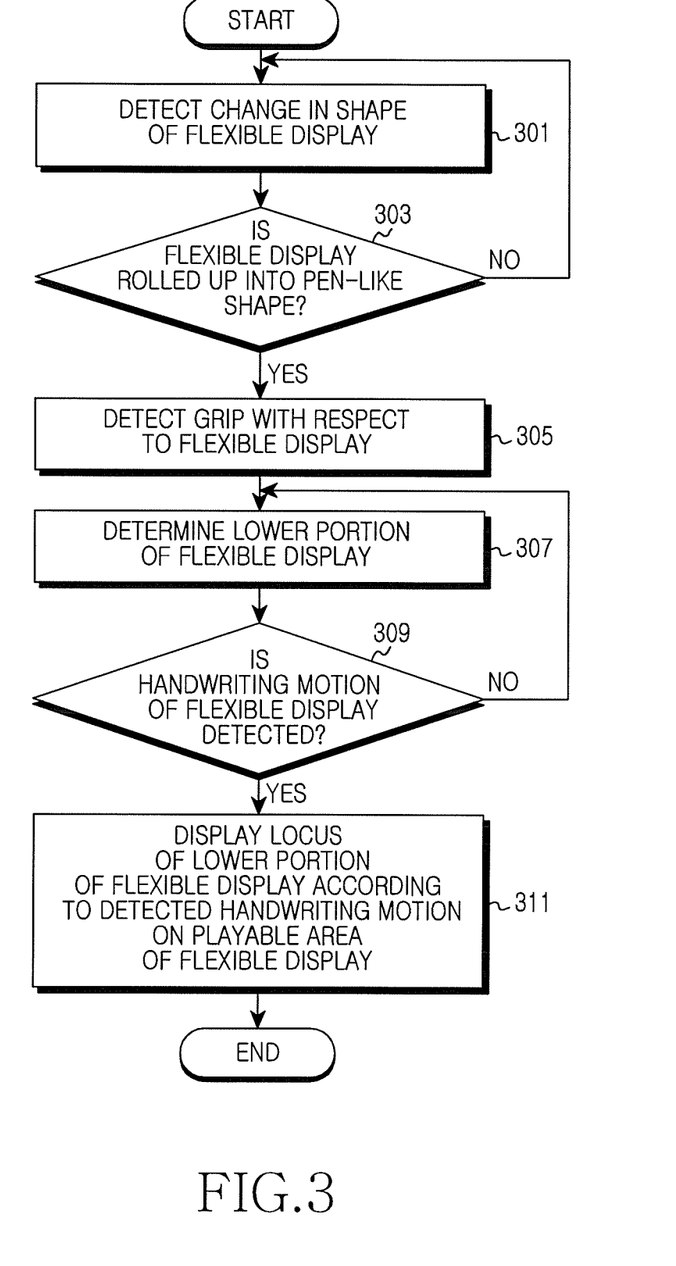
FIG. 3 illustrates a process of inputting a character according to the motion of a flexible display in an electronic device according to an embodiment of the present disclosure.

FIG. 3 illustrates a process of inputting a character according to the motion of a flexible display in the electronic device 100 according to an embodiment of the present disclosure.

Figure 4:
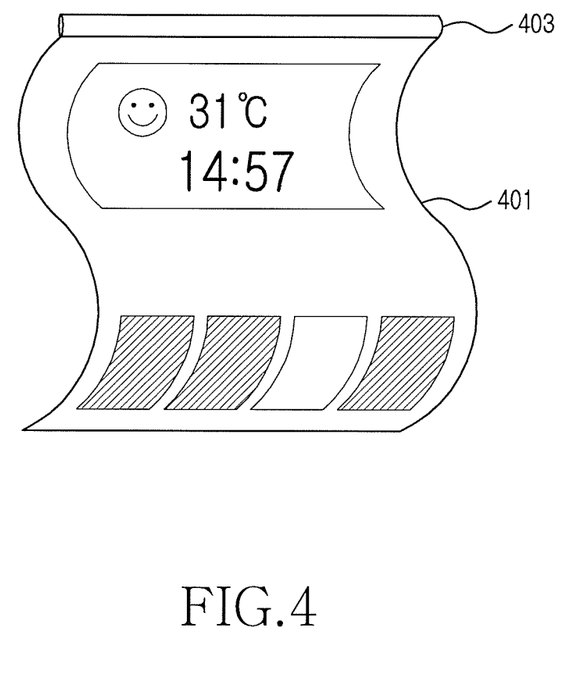
FIG. 4 illustrates a flexible display including a laser pointer according to an embodiment of the present disclosure.

Referring to FIG. 3, in step 301, the electronic device 100 detects change in the shape of a flexible display. In this case, the electronic device 100 may include a laser pointer for outputting a laser. For example, the electronic device 100 may include, as illustrated in FIG. 4, a flexible display 401 for displaying a graphic effect and a laser pointer 403 for outputting a laser. In addition, the electronic device 100 may include a proximity sensor.

In step 303, the electronic device 100 determines whether the flexible display is rolled up into a pen-like shape. In this case, when the electronic device 100 includes the laser pointer, the electronic device 100 determines whether the flexible display is rolled up around the laser pointer.

Figure 5:
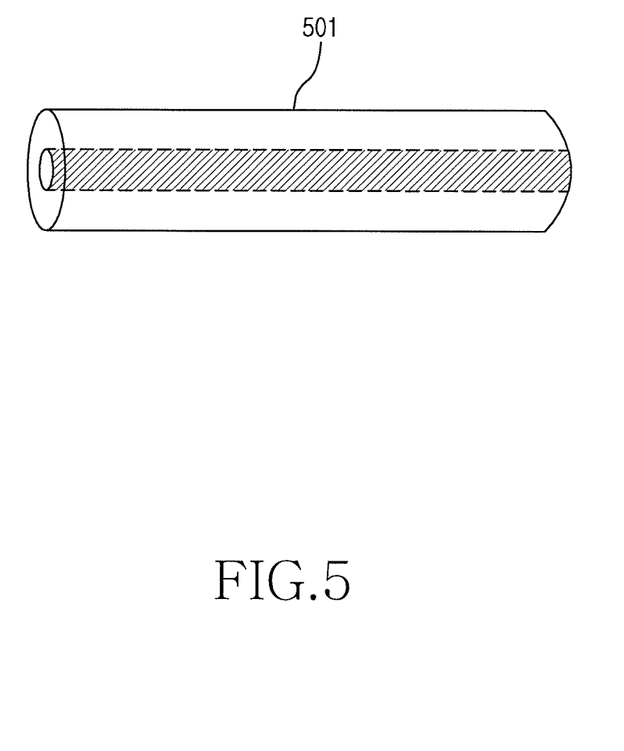
FIG. 5 illustrates a flexible display rolled up into a pen-like shape in an electronic device according to an embodiment of the present disclosure.
Figure 7:
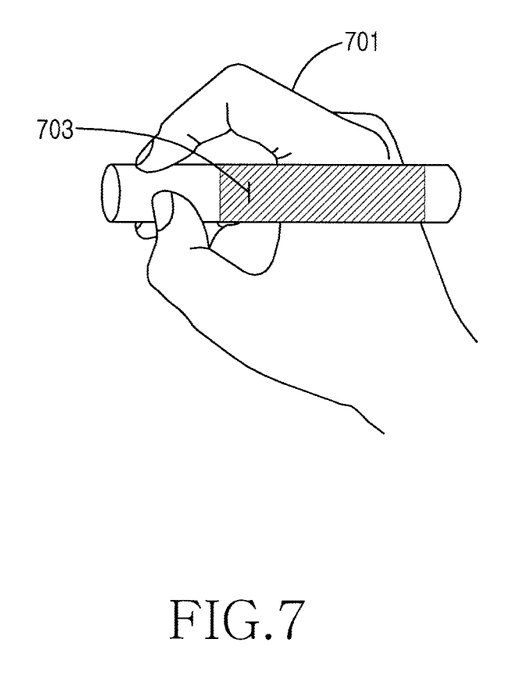
FIG. 7 illustrates a rolled-up flexible display gripped by a user in an electronic device according to another embodiment of the present disclosure.

When the flexible display is rolled up into a pen-like shape, the electronic device proceeds to step 305. In step 305, the electronic device 100 detects a grip with respect to the flexible display. For example, as illustrated in FIG. 5, when the flexible display 501 is rolled up around the laser pointer, the electronic device detects a grip with respect to the rolled-up flexible display 501. Specifically, the electronic device 100 may detect the grip with respect to the flexible display 501 by using a grip sensor, and determine an area in which the flexible display 501 is gripped and an area in which the flexible display 501 is not gripped. In this case, the electronic device 100 may display a character input cursor and/or a character input window on the area in which the flexible display is not gripped. For example, when the flexible display rolled up into a pen-like shape is gripped by the user's hand 701 as illustrated in FIG. 7, the electronic device 100 may display the character input cursor 703 on the area in which the flexible display is not gripped.

Figure 6:
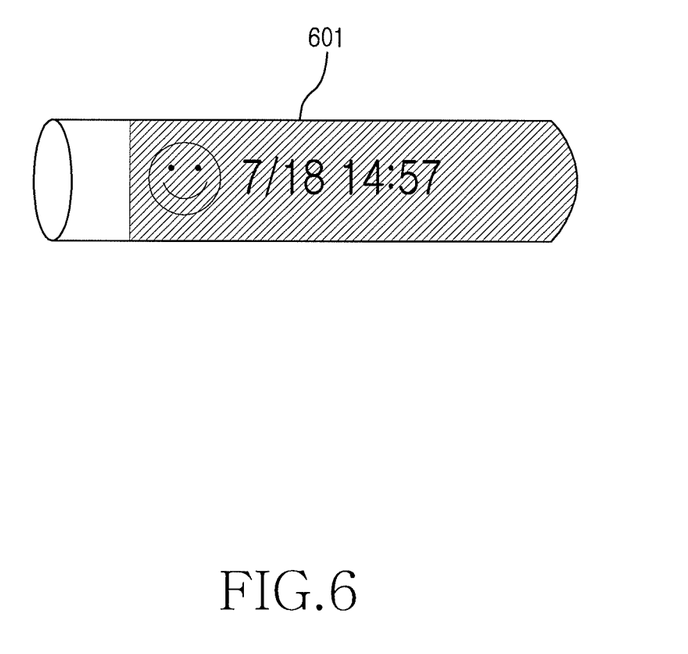
FIG. 6 illustrates an example for displaying simple information on a flexible display rolled up into a pen-like shape in an electronic device according to an embodiment of the present disclosure.

In addition, when the flexible display is rolled up into a pen-like shape, the electronic device 100 may determine the outer surface (or external surface) of the rolled-up flexible display 130 as a displayable area and display simple information. For example, when the flexible display is rolled up into a pen-like shape as illustrated in FIG. 6, the electronic device 100 may display time information on the displayable area 601 of the flexible display that is rolled up into a pen-like shape. As another example, when the flexible display is rolled up into a pen-like shape, the electronic device 100 may display a message representing that character input is possible with respect to the displayable area 601 of the flexible display that is rolled up into a pen-like shape.

Thereafter, in step 307, the electronic device 100 determines a lower portion of the flexible display. In this case, the electronic device 100 may determine the lower portion of the flexible display by using at least one sensor included in the electronic device 100. For example, the electronic device 100 may detect the tilt of the gripped flexible display and analyze the detected tilt to determine the lower portion of the flexible display by using a tilt sensor. As another example, the electronic device 100 may determine the lower portion of the gripped flexible display by using a gravity sensor.

Thereafter, the electronic device 100 determines whether the handwriting motion of the flexible display is detected. In this case, the electronic device 100 may detect the handwriting motion according to the movement of the flexible display by using a motion sensor provided in the lower portion of the flexible display.

Figure 8:
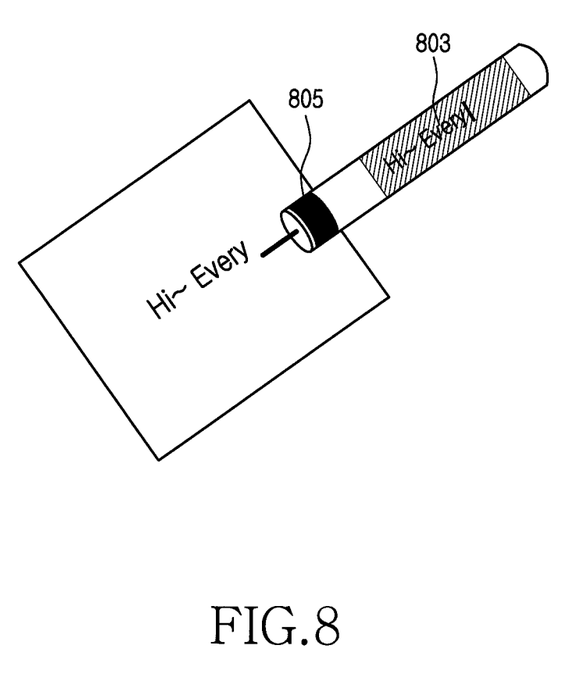
FIG. 8 illustrates an example for inputting a character according to the motion of a flexible display in an electronic device according to another embodiment of the present disclosure.

When the handwriting motion of the flexible display is detected, the electronic device 100 displays a locus according to the detected handwriting motion on the displayable area of the flexible display in step 311. In particular, when the electronic device includes a proximity sensor and a laser pointer, the electronic device 100 may detect an object approaching the lower portion of the flexible display within a predetermined distance by using the proximity sensor and when the object is detected, enable the laser pointer to output a laser, thereby displaying the locus according to the handwriting motion to the user. In this case, the electronic device 100 may analyze the detected locus of the flexible display and display a character corresponding to the analyzed locus on the flexible display or the detected locus on the flexible display in real time. For example, when, as a result of analysis of the movement locus of the lower portion of the flexible display, characters "Hi~Every" are written through the flexible display, the electronic device 100 may display "Hi~Every" on the area 803 in which the flexible display is not gripped. In this case, the electronic device 100 may enable the laser pointer to output a laser to display the locus to the user, and display font information 805 on a specific area of the flexible display. In this case, the font information 805 includes color, size and style information. Thereafter, the electronic device 100 ends the process according to the embodiment of the present disclosure.

When the handwriting motion of the flexible display is not detected in step 309, the electronic device 100 returns to step 307 to perform subsequent steps again.

Embodiments of the present disclosure and all functional operations described in this specification may be implemented in computer software, firmware, or hardware, including the structures disclosed in this specification and their structural equivalents, or in combinations of one or more of them. Embodiments of the present disclosure described in this specification can be implemented as one or more computer program products, i.e., one or more modules of computer program instructions encoded on a computer readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While the disclosure has been shown and described with reference to certain exemplary embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method for operating an electronic device, the method comprising:
   detecting whether a flexible display of the electronic device is in a rolled up state;
   detecting a handwriting motion of the flexible display using at least one sensor while the flexible display is in the rolled up state; and
   displaying a locus detected according to the handwriting motion of the flexible display on rolled up area of the flexible display.

2. The method of claim 1, wherein detecting the handwriting motion of the flexible display comprises:

determining upper and lower portions of the rolled-up flexible display using the at least one sensor; and detecting the handwriting movement using a sensor provided in the lower portion of the flexible display.

3. The method of claim 2, wherein the at least one sensor includes at least one of a tilt sensor and a gravity sensor.

4. The method of claim 1, further comprising:

determining an outer surface of the flexible display as a displayable area when the flexible display is rolled up into a pen-like shape;

displaying first information on the determined displayable area, wherein the first information includes at least one of time information, user interface/user experience information, or other graphic effect information.

5. The method of claim 1, further comprising:

detecting a grip with respect to the flexible display when the flexible display is rolled up into a pen-like shape; and determining an area in which the grip is detected and an area in which the grip is not detected among an area of the flexible display.

6. The method of claim 5, wherein the locus according to the handwriting motion of the flexible display is displayed on the area in which the grip is not detected among the area of the flexible display.

7. The method of claim 1, wherein displaying the locus according to the handwriting motion on the flexible display comprises:

analyzing the locus; and displaying a character corresponding to a result of the analysis on the flexible display.

8. The method of claim 1, wherein displaying the locus according to the handwriting motion on the flexible display comprises displaying a graphic effect according to the locus on the flexible display in real time.

9. The method of claim 1, further comprising applying at least one font to the locus according to the handwriting motion prior to display, wherein the font includes at least one of color, size and style information.

10. The method of claim 1, further comprising outputting a laser through a laser pointer included in the flexible display when the flexible display is rolled up into a pen-like shape.

11. An electronic device comprising:

at least one processor;

a flexible display;

a motion sensor; and a memory configured to store at least one program stored, wherein the at least one processor is configured to execute program code of the program to:

detect whether a flexible display is in a rolled up state;

detect a handwriting motion the flexible display using at least one sensor while the flexible display is in the rolled up state; and cause the flexible display to display a locus detected according to the handwriting motion of the flexible display on a rolled up area of flexible display.

12. The electronic device of claim 11, wherein the processor is further configured to execute program code of the program to:

determine upper and lower portions of the rolled-up flexible display by using the at least one sensor; and detect the handwriting movement using a sensor provided in the lower portion of the flexible display.

13. The electronic device of claim 12, wherein the at least one sensor includes at least one of a tilt sensor and a gravity sensor.

14. The electronic device of claim 11, wherein the processor is further configured to execute program code of the program to:

determine an outer surface of the flexible display as a displayable area when the flexible display is rolled up into a pen-like shape; and display first information on the determined displayable area, wherein the first information includes at least one of time information, user interface/user experience information, or other graphic effect information.

15. The electronic device of claim 11, further comprising a grip sensor, wherein the processor is further configured to execute program code of the program to:

detect, via the grip sensor, a grip with respect to the flexible display when the flexible display is rolled up into a pen-like shape; and determine an area in which the grip is detected and an area in which the grip is not detected among an area of the flexible display.

16. The electronic device of claim 15, wherein the locus according to the handwriting motion is displayed on the area in which the grip is not detected among the area of the flexible display.

17. The electronic device of claim 11, wherein the processor is further configured to execute program code of the program to:

analyze the locus; and cause the flexible display to display a character corresponding to a result of the analysis.

18. The electronic device of claim 11, wherein the processor is further configured to execute program code of the program to cause the flexible display to display a graphic effect according to the locus in real time.

19. The electronic device of claim 11, wherein the processor is further configured to execute program code of the program to apply at least one font to the locus according to the handwriting motion of the flexible display prior to display, wherein the font includes at least one of color, size and style information.

20. The electronic device of claim 11, wherein the processor is further configured to execute program code of the program to cause output of a laser through a laser pointer included in the flexible display when the flexible display is rolled up into a pen-like shape.

* * * * *